(12) United States Patent
Huber et al.

(10) Patent No.: US 9,742,235 B2
(45) Date of Patent: Aug. 22, 2017

(54) STAR DISK FOR AN ELECTRIC MACHINE

(71) Applicant: Bayerische Motoren Werke Aktiengesellschaft, Munich (DE)

(72) Inventors: Andreas Huber, Landshut (DE); Jan Sousek, Putzbrunn (DE); Endre Barti, Munich (DE); Berthold Schinnerl, Thalhausen/Kranzberg (DE); Dragoljub Duricic, Munich (DE); Gerd Britten, Munich (DE); Johannes Mintzlaff, Hoehenkirchen-Siegertsbrunn (DE); Alexander Maier, Glonn (DE); Andreas Mayr, Waldkraiburg (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 0 days.

(21) Appl. No.: 15/235,178

(22) Filed: Aug. 12, 2016

(65) Prior Publication Data

US 2016/0352173 A1    Dec. 1, 2016

Related U.S. Application Data

(63) Continuation of application No. PCT/EP2015/055866, filed on Mar. 20, 2015.

(30) Foreign Application Priority Data

Apr. 3, 2014   (DE) .................. 10 2014 206 356

(51) Int. Cl.
*H02K 3/51* (2006.01)
*H02K 5/20* (2006.01)
(Continued)

(52) U.S. Cl.
CPC ............. *H02K 3/51* (2013.01); *H02K 1/28* (2013.01); *H02K 5/20* (2013.01); *H02K 9/08* (2013.01);
(Continued)

(58) Field of Classification Search
CPC ...... H02K 3/51; H02K 3/522; H02K 5/20; H02K 9/22
(Continued)

(56) References Cited

U.S. PATENT DOCUMENTS 935,397 A      9/1909  Nikonow
4,873,463 A *  10/1989 Jones .................. H02K 29/10
                                                      310/177
(Continued)

FOREIGN PATENT DOCUMENTS

DE      307967     6/1930
DE      307968     6/1930
(Continued)

OTHER PUBLICATIONS

International Search Report (PCT/ISA/210) issued in PCT Application No. PCT/EP2015/055866 dated Jun. 18, 2015 with English translation (seven pages).

(Continued)

*Primary Examiner* — Terrance Kenerly
(74) *Attorney, Agent, or Firm* — Crowell & Moring LLP

(57) ABSTRACT

A rotor element or a star disk which is designed to be arranged on an electrically excited rotor of an electric machine, includes a base which is designed to be arranged in an insert between the axial end of a laminate stack of the rotor and at least one end winding of the rotor. At least one fin is fastened on the base and is designed to protrude in the insert through the at least one end winding axially out of the at least one end winding.

12 Claims, 2 Drawing Sheets

(51) Int. Cl.
*H02K 9/08* (2006.01)
*H02K 9/22* (2006.01)
*H02K 1/28* (2006.01)
*H02K 3/38* (2006.01)
*H02K 5/167* (2006.01)
*H02K 9/19* (2006.01)

(52) U.S. Cl.
CPC ............... *H02K 9/22* (2013.01); *H02K 3/38* (2013.01); *H02K 5/1672* (2013.01); *H02K 9/19* (2013.01)

(58) Field of Classification Search
USPC ........................ 310/194, 216.069–216.073
See application file for complete search history.

(56) References Cited

U.S. PATENT DOCUMENTS

| | | | |
|---|---|---|---|
| 4,990,810 A * | 2/1991 | Newhouse | H02K 3/527 |
| | | | 310/179 |
| 5,264,748 A | 11/1993 | Ootsuka et al. | |
| 5,717,273 A * | 2/1998 | Gulbrandson | H02K 3/345 |
| | | | 310/194 |
| 5,848,461 A | 12/1998 | York et al. | |
| 6,366,001 B1 | 4/2002 | Gunnarsson et al. | |
| 2010/0289353 A1 * | 11/2010 | Pal | F04D 25/082 |
| | | | 310/64 |
| 2011/0316365 A1 * | 12/2011 | Kim | H02K 1/18 |
| | | | 310/43 |
| 2012/0038233 A1 * | 2/2012 | Funda | F16C 32/0468 |
| | | | 310/90.5 |
| 2012/0207631 A1 | 8/2012 | Lehmann | |
| 2014/0091670 A1 | 4/2014 | Chun et al. | |

FOREIGN PATENT DOCUMENTS

| | | |
|---|---|---|
| DE | 596337 | 4/1934 |
| DE | 1 488 019 A | 4/1969 |
| DE | 2 315 840 A | 9/1974 |
| DE | 100 05 006 A1 | 8/2000 |
| DE | 201 02 590 U1 | 6/2002 |
| DE | 10 2010 001 354 A1 | 3/2011 |
| KR | 10-1364028 B1 | 2/2014 |
| WO | WO 85/00937 A1 | 2/1985 |

OTHER PUBLICATIONS

German-language Written Opinion (PCT/ISA/237) issued in PCT Application No. PCT/EP2015/055866 dated Jun. 18, 2015 (five pages).

German Search Report issued in counterpart German Application No. 10 2014 206 356.6 dated Jun. 17, 2016 with partial English translation (10 pages).

* cited by examiner

STAR DISK FOR AN ELECTRIC MACHINE

CROSS REFERENCE TO RELATED APPLICATIONS

This application is a continuation of PCT International Application No. PCT/EP2015/055866, filed Mar. 20, 2015, which claims priority under 35 U.S.C. §119 from German Patent Application No. 10 2014 206 356.6, filed Apr. 3, 2014, the entire disclosures of which are herein expressly incorporated by reference.

BACKGROUND AND SUMMARY OF THE INVENTION

The invention relates to an improved star disk for an electrically-excited electric machine.

In electrically-excited electric machines, star disks are used for the mechanical support of the end windings of the rotor in response to high centrifugal forces associated with the rapid rotation of the rotor. Star disks can prevent a defect of the electric machine associated with a failure of a winding in the end winding area. Star disks are fitted to the axial end of the rotor. One side of the star disk adjoins the laminate stack of the rotor, and may be electrically isolated from the latter. The rotor windings are routed on the other side of the star disk. At their radial end, star disks from the prior art are customarily provided with a projection, by means of which the rotor accommodates the centrifugal forces of the end windings. It is understood that the projection is subject to high mechanical loading as a result.

Electrically-excited machines also pose a problem, in that heat losses occurring within the rotor need to be evacuated. In the prior art, in some cases, cooling ducts are provided in the rotor, through which a coolant fluid flows. Firstly, these arrangements are expensive, and secondly they cannot ensure the cooling of the end windings to the requisite degree.

Accordingly, the object of the invention is to provide an improved star disk with better mechanical support for the end windings and/or which cools the end windings more effectively.

This and other objects a achieved by a rotor element and an electric machine having such a rotor element, in accordance with embodiments of the invention.

A rotor element according to the invention is designed to be arranged on an electrically-excited rotor of an electric machine. The rotor element comprises a base which is designed to be arranged in the insert between the axial end of a laminate stack of the rotor and at least one end winding. The rotor element comprises at least one fin, which is fastened on the base and is designed to protrude in the insert through at least one end winding axially out of the at least one end winding.

The rotor element may be a "star disk". As at least one fin runs from the base of the rotor element through the end winding, the mechanical stability of the rotor, and specifically the mechanical stability of the winding, is improved. This is because the winding is mechanically supported at a number of points. Moreover, the fin can conduct heat from the interior of the end winding to the exterior, thereby improving the cooling of the end winding.

On an outer radial area of the rotor element, an end element may be arranged, which extends axially into the insert, and is designed to be arranged in the insert radially outwards from the end winding. The end element mechanically supports the radial outer end of the end winding.

The at least one fin may terminate within the end winding or at the outer edge of the end winding, and thus primarily fulfils a mechanical support function. Preferably, however, the fin also projects beyond the end winding, and thus additionally fulfils a cooling function. The at least one fin projects beyond the end winding by preferably 100%, more preferably by 150%, and most preferably by at least 200% of the thickness of the end winding. Heat from the end winding is conducted by the fins and dissipated in the motor interior. The further the fin projects from the rotor winding, the more heat can be dissipated. However, a greater fin length will increase space requirements in the axial direction.

On the side facing the end windings, the rotor element may be configured convexly. The end windings are thus protected against damage from the rotor element.

On the side facing the laminate stack, the rotor element may be configured for electrical isolation. By this arrangement, an electrical short-circuit on the laminate stack is prevented. Naturally, the rotor element is not necessarily required to touch the laminate stack, and any other elements may be arranged between the rotor element and the laminate stack.

The rotor element may be formed of metal, aluminum and/or of a plastic material. For example, the fin of the rotor element may be constructed of metal, in order to ensure optimum thermal conduction. The laminate stack-facing side of the rotor element may be constructed of a plastic material, in order to ensure good insulating properties.

The object of the invention is fulfilled by an electric machine with a stator and a rotor, which rotor is arranged within the stator. The stator and the rotor may be provided with windings which generate a magnetic field when current flows therein. The above-mentioned rotor element may be arranged at an axial end of the rotor, whereby the rotor element is not necessarily in contact with the rotor, and any other elements may be arranged between the rotor element and the rotor. For example, the rotor element may be in contact with the laminate stack of the rotor. At least one end winding of the rotor winding may be arranged above the base of the rotor element. The electric machine may be a motor and/or a generator. The rotor element protects the rotor winding against mechanical damage by centrifugal forces, and conducts thermal losses away from the end winding.

The electric machine may be provided with a stator fin, which is adjacent to the fin on the rotor element. The stator fin may be configured in a fixed arrangement in relation to the stator of the electric machine. The stator fin can receive thermal radiation and/or convective heat which is emitted from the fin. The stator fin can dissipate the heat thus captured, for example to an end housing of the electric machine. From here, heat is dissipated into the vehicle cooling system.

The stator fin may project between two fins on the rotor element and/or between one fin and the end element of the rotor element. The electric machine may be provided with a stator fin arrangement comprised of at least two stator fins, whereby one fin on the rotor element projects between two stator fins. By these arrangements, the transmission of heat from the end windings to the stator fins is improved.

The fins on the rotor element may be arranged concentrically to the axis of rotation. The fins may also be used for the balancing of the rotor. Using the star disk according to the invention, the end windings of the rotor are fanned out by a star disk with integral fins. Accordingly, mechanical loads on the end windings of the rotor are fanned out over a number of points. Consequently, the cooling of the end windings is improved by the shorter thermal conduction paths. Stator fins may be arranged in the end housing of the rotor, in order to improve heat transfer.

Other objects, advantages and novel features of the present invention will become apparent from the following detailed description of one or more preferred embodiments when considered in conjunction with the accompanying drawings.

DETAILED DESCRIPTION OF THE DRAWINGS

Figure 1:
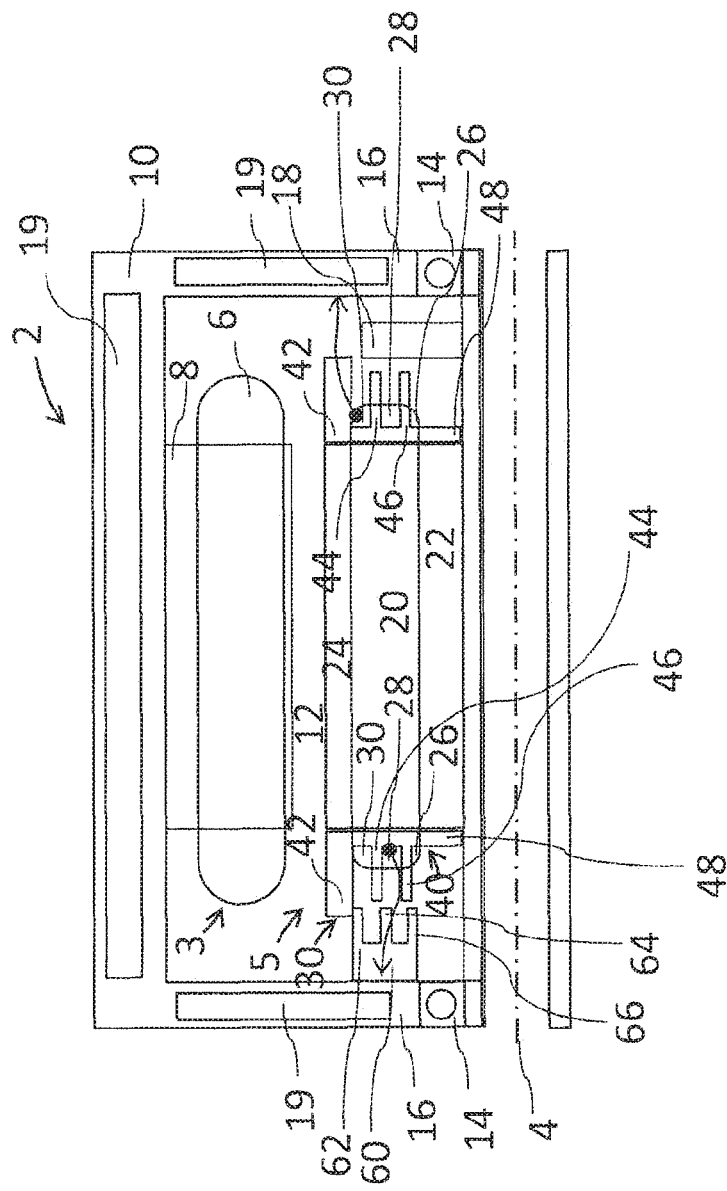
FIG. 1 shows a longitudinal section of an electric machine with a rotor element according to an embodiment of the invention.
Figure 2:
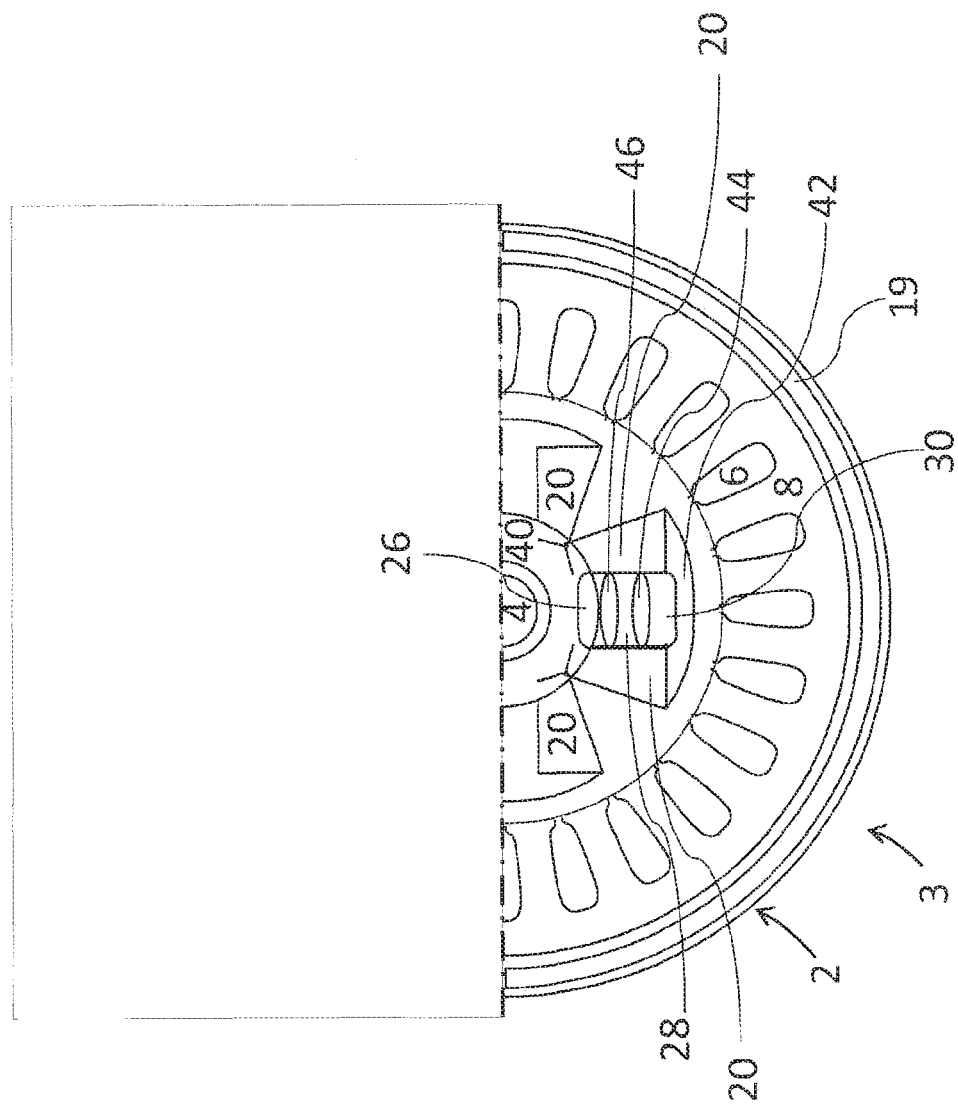
FIG. 2 shows a cross-section of an electric machine with a rotor element according to an embodiment of the invention.

Reference is made to FIGS. 1 and 2, whereby FIG. 1 shows a longitudinal section of an electric machine 2 and FIG. 2 shows a cross-section of an electric machine 2. The electric machine 2 may be a generator and/or a motor. Hereinafter, the electric machine 2 is described as a motor. It is understood that the description will apply correspondingly to a generator.

The electric machine 2 includes a housing 10 with a stator 3, on which the motor laminate stacks 8 are arranged. The stator winding 6 is arranged on the stator laminate stacks 8. The housing 10 has an end housing 16, on which the bearing 14 is arranged. A shaft 4 runs in the bearing 14.

The iron stacks 22, 24 of the rotor 5 are arranged on the shaft 4. An air gap 12 is arranged between the iron stacks 22, 24 of the rotor 5 surrounding the iron stack 8 of the stator.

A conventional electric mechanism provided with at least three stator windings 6 and at least one rotor winding 20. The stator windings 6 are customarily excited by alternating current, and the rotor winding 20 customarily by direct current. A control arrangement of this type will be familiar to one of a skill in the art, and is not described in greater detail here. The stator windings 6 and the rotor windings generate magnetic fields, which may result in the attraction or repulsion of the rotor and the stator. The rotation of the rotor is effected accordingly. The mode of operation of an electric motor will be familiar to the skilled artisan and, accordingly, does not need to be described in greater detail.

The rotor element 40 is arranged at the axial end of the rotor 5. The rotor element 40 may be a star disk. The rotor element 40 has a base 48, which is arranged at the axial end of the rotor. The rotor element 40 also has an end element 42, which extends axially from the base and is arranged radially outwards from the end winding 20 of the rotor. The end element 42 supports the end winding 20 against centrifugal forces. The rotor element 40 includes fins 44, 46, which project from the end winding. The fins divide the end winding of the rotor windings 20 into an inner section 26, a middle section 28 and an outer section 30. During rotation, the inner section 26 is supported by the inner fin 46, the middle section 28 is supported by the outer fin 44, and the outer section is supported by the end element 42. Thus, the action of the fins 44, 46 is such that the end winding of the rotor winding 20 is supported at a number of points. The service life and the reliability of the electric machine 2 is improved accordingly.

The motor is provided with an inductive rotary connection 18 which transfers current to the rotor 5. A heat absorption device 16 is arranged on the end housing 16, provided with a plurality of stator fins 62, 64, 66. The stator fins 62, 64, 66 adjoin the fins 44, 46 on the rotor element 40. Preferably, the stator fins 62, 64, 66 may be arranged within and/or between the fins 44, 46 and the end element 42 of the rotor element 44.

Heat generated in the winding 20 of the rotor is transferred from the fins 44, 46 of the rotor element 40 by way of infrared radiation and/or convection to the stator fins 62, 64, 66, where it is transferred by the thermal absorption device 60 to the end housing 16. From here, heat is conducted away from the end housing by a vehicle cooling system 19. The vehicle cooling system may be a fluid-based cooling system or a gas-based cooling system, and may also incorporate the end housing.

The action of the rotor element according to the invention is such that the end winding of an electrically-excited machine is mechanically supported in a more reliable and materially protective manner and/or waste heat generated in the end windings can be dissipated more efficiently. The resulting electric machine is more reliable and more efficient.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A rotor element arrangeable on an electrically-excited rotor of an electric machine, comprising:
   a base configured to be arranged in an insert between an axial end of a laminate stack of the rotor and at least one end winding of the rotor; and
   at least one fin, which is integral with the base and is configured to protrude in the insert's axial direction through the at least one end winding axially out of the at least one end winding; and
   a stator fin arrangement comprising at least two stator fins, one fin on the rotor element projecting between the at least two stator fins.

2. The rotor element according to claim 1, wherein, on an outer radial area of the rotor element, an end element is arranged, which extends axially into the insert, and is designed to be arranged in the insert radially outwards from the end winding.

3. The rotor element according to claim 1, wherein the fin projects beyond the end winding by at least 50% of the thickness of the end winding.

4. The rotor element according to claim 1, wherein the fin projects beyond the end winding by at least 100% of the thickness of the end winding.

5. The rotor element according to claim 1, wherein the fin projects beyond the end winding by at least 150% of the thickness of the end winding.

6. The rotor element according to claim 1, wherein the fin projects beyond the end winding by at least 200% of the thickness of the end winding.

7. The rotor element according to claim 1, wherein, on a side facing the end winding, the rotor element is configured convexly.

8. The rotor element according to claim 1, wherein, on a side facing the laminate stack, the rotor element is configured for electrical isolation.

9. The rotor element according to claim 1, wherein the rotor element is formed of metal, aluminum and/or of a plastic material.

10. An electric machine, comprising:
a stator;
a rotor, which is arranged within the stator, the rotor having a rotor winding;
at least one rotor element arranged at an axial end of the rotor, the rotor element comprising a base configured to be arranged in an insert between an axial end of a laminate stack of the rotor and at least one end winding of the rotor, and at least one fin, which is integral with the base and is configured to protrude in the insert's axial direction through the at least one end winding axially out of the at least one end winding; and
a stator fin arrangement comprising of at least two stator fins, one fin on the rotor element projecting between the at least two stator fins, wherein
the at least one end winding of the rotor winding is arranged above the base of the rotor element.

11. The electric machine according to claim 10, wherein the stator fin is configured in a fixed arrangement in relation to the stator and is adjacent to the fin on the rotor element.

12. A rotor element arrangeable on an electrically-excited rotor of an electric machine, comprising:
a base configured to be arranged in an insert between an axial end of a laminate stack of the rotor and at least one end winding of the rotor; and
at least one fin, which is integral with the base and is configured to protrude in the insert's axial direction through the at least one end winding axially out of the at least one end winding; and
a stator, wherein
a stator fin is configured in a fixed arrangement in relation to the stator and is adjacent to the at least one fin, and
the stator fin projects between two fins on the rotor element and/or between one fin on the rotor element and an end element of the rotor element.

* * * * *